(12) United States Patent
Kazuno

(10) Patent No.: US 9,799,936 B2
(45) Date of Patent: Oct. 24, 2017

(54) FUEL CELL SYSTEM AND FUEL CELL AUTOMOBILE

(71) Applicant: HONDA MOTOR CO., LTD., Tokyo (JP)

(72) Inventor: Shuichi Kazuno, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 22 days.

(21) Appl. No.: 14/748,235

(22) Filed: Jun. 24, 2015

(65) Prior Publication Data

US 2015/0380788 A1 Dec. 31, 2015

(30) Foreign Application Priority Data

Jun. 25, 2014 (JP) .................................. 2014-130700
Dec. 12, 2014 (JP) .................................. 2014-251682

(51) Int. Cl.
| | | |
|---|---|---|
| H01M 16/00 | (2006.01) | |
| H01M 8/04858 | (2016.01) | |
| B60L 11/18 | (2006.01) | |
| H01M 10/42 | (2006.01) | |

(52) U.S. Cl.
CPC .......... *H01M 16/006* (2013.01); *B60L 11/18* (2013.01); *H01M 8/04873* (2013.01); *H01M 8/04888* (2013.01); *H01M 10/425* (2013.01); *H01M 2250/20* (2013.01); *Y02T 90/32* (2013.01)

(58) Field of Classification Search
None
See application file for complete search history.

(56) References Cited

U.S. PATENT DOCUMENTS

2010/0332063 A1* 12/2010 Saeki .................... B60L 3/00
701/22

FOREIGN PATENT DOCUMENTS

| JP | 2008-091319 | 4/2008 |
| JP | 2009-142098 | 6/2009 |

OTHER PUBLICATIONS

Japanese Office Action for corresponding JP Application No. 2014-251682, Jan. 24, 2017 (w/ English machine translation).

* cited by examiner

*Primary Examiner* — Yoshitoshi Takeuchi
(74) *Attorney, Agent, or Firm* — Mori & Ward, LLP

(57) ABSTRACT

A fuel cell system includes a fuel cell, an electrical storage device, a fuel-cell-side converter, an electrical-storage-device-side converter, and a controller. The fuel cell is to output fuel cell voltage. The fuel-cell-side converter is configured to apply the fuel cell voltage to a load in a direct connection state or configured to apply a stepped-up fuel cell voltage to the load. The electrical-storage-device-side converter is configured to apply a stepped-up electrical storage device voltage to the load. The controller is configured to control duty of the electrical-storage-device-side converter so that the fuel cell voltage changes smoothly in a case where a state in which the fuel cell voltage is controlled by the fuel-cell-side converter is switched to a state in which the fuel-cell-side converter is set to the direct connection state and the fuel cell voltage is controlled by the electrical-storage-device-side converter.

19 Claims, 9 Drawing Sheets

FUEL CELL SYSTEM AND FUEL CELL AUTOMOBILE

CROSS-REFERENCE TO RELATED APPLICATIONS

The present application claims priority under 35 U.S.C. §119 to Japanese Patent Application No. 2014-130700, filed Jun. 25, 2014, entitled "Fuel cell system with load driven by two power sources and fuel cell automobile" and Japanese Patent Application No. 2014-251682, filed Dec. 12, 2014, entitled "Fuel cell system with load driven by two power sources and fuel cell automobile." The contents of these applications are incorporated herein by reference in their entirety.

BACKGROUND

1. Field

The present disclosure relates to a fuel cell system and a fuel cell automobile.

2. Description of the Related Art

Fuel cell systems with loads driven by two power sources have hitherto been known. In a typical fuel cell system with a load driven by two power sources, a fuel-cell-side converter is provided between the load and an output terminal of a fuel cell and an electrical-storage-device-side converter is provided between the load and input-output terminals of an electrical storage device to drive the load. Such a fuel cell system with a load driven by two power sources is illustrated in, for example, FIG. 1 of Japanese Unexamined Patent Application Publication No. 2008-91319.

In a typical fuel cell system with a load driven by two power sources, as described in Japanese Unexamined Patent Application Publication No. 2008-91319, the fuel-cell-side converter is in a direct connection state and the fuel cell voltage is controlled by the electrical-storage-device-side converter in a low fuel cell power area where the fuel cell voltage is higher than the back electromotive force of the drive motor and the fuel cell output current is small (refer to [0043] in Japanese Unexamined Patent Application Publication No. 2008-91319). In contrast, the fuel-cell-side converter is in a step-up state and the fuel cell voltage is controlled by the fuel-cell-side converter in a high fuel cell power area where the fuel cell voltage is lower than the back electromotive force of the drive motor and the fuel cell output current is large (refer to [0044] and [0045] in Japanese Unexamined Patent Application Publication No. 2008-91319).

SUMMARY

According to one aspect of the present invention, a fuel cell system with a load driven by two power sources includes a fuel cell, an electrical storage device, a fuel-cell-side converter, an electrical-storage-device-side converter, and a control unit. The fuel cell outputs fuel cell voltage. The electrical storage device outputs electrical storage device voltage. The fuel-cell-side converter applies the fuel cell voltage to the load in a direct connection state or steps up the fuel cell voltage to apply the stepped-up fuel cell voltage to the load. The electrical-storage-device-side converter steps up the electrical storage device voltage to apply the stepped-up electrical storage device voltage to the load. The control unit controls operations of the fuel-cell-side converter and the electrical-storage-device-side converter. The control unit controls duty of the electrical-storage-device-side converter so that the fuel cell voltage is subjected to smooth transition when a state in which the fuel cell voltage is controlled by the fuel-cell-side converter is switched to a state in which the fuel-cell-side converter is set to the direct connection state and the fuel cell voltage is controlled by the electrical-storage-device-side converter.

According to another aspect of the present invention, a fuel cell system includes a fuel cell, an electrical storage device, a fuel-cell-side converter, an electrical-storage-device-side converter, and a controller. The fuel cell is to output fuel cell voltage. The electrical storage device is to output electrical storage device voltage. The fuel-cell-side converter is configured to apply the fuel cell voltage to a load in a direct connection state or configured to apply a stepped-up fuel cell voltage to the load. The electrical-storage-device-side converter is configured to apply a stepped-up electrical storage device voltage to the load. The controller is configured to control duty of the electrical-storage-device-side converter so that the fuel cell voltage changes smoothly in a case where a state in which the fuel cell voltage is controlled by the fuel-cell-side converter is switched to a state in which the fuel-cell-side converter is set to the direct connection state and the fuel cell voltage is controlled by the electrical-storage-device-side converter.

According to further aspect of the present invention, a fuel cell automobile includes the fuel cell system. The load includes a drive motor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
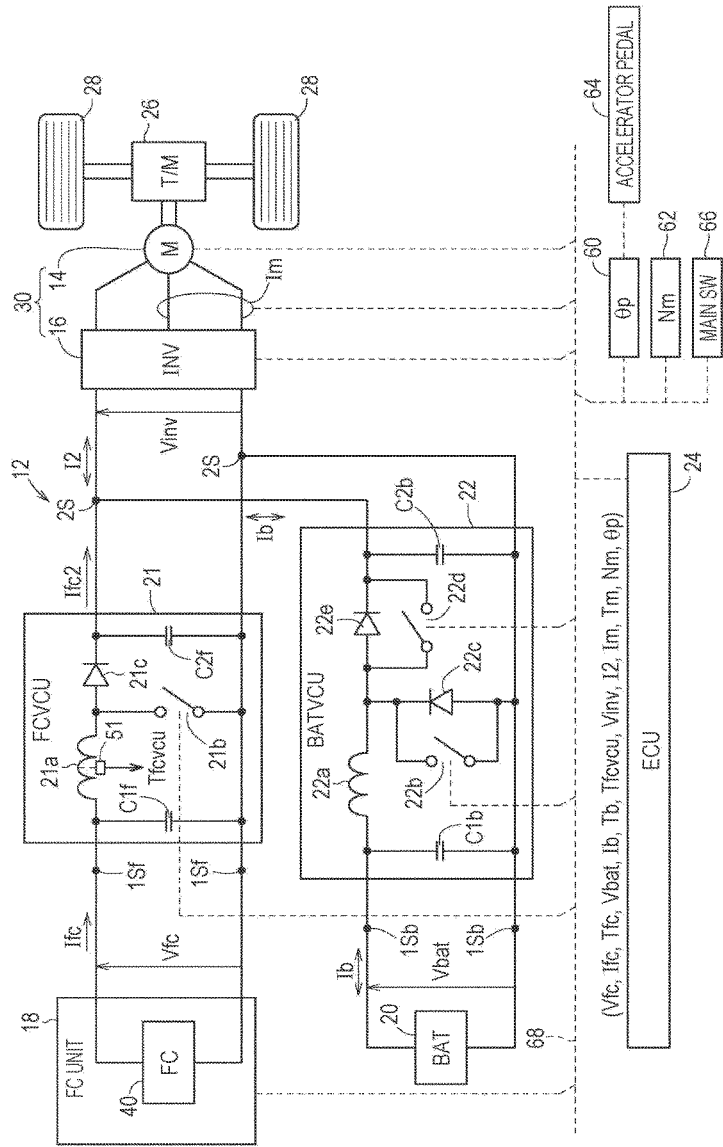
FIG. 1 schematically illustrates an example of the entire configuration of a fuel cell automobile to which a fuel cell system serving as a fuel cell system with a load driven by two power sources according to an embodiment of the present disclosure is applied.

The embodiments will now be described with reference to the accompanying drawings, wherein like reference numerals designate corresponding or identical elements throughout the various drawings.

A fuel cell system with a load driven by two power sources according to an embodiment of the present disclosure will herein be described with reference to the attached drawings in association with a fuel cell automobile to which the fuel cell system with a load driven by two power sources is applied.

FIG. 1 schematically illustrates an example of the entire configuration of a fuel cell automobile 10 (hereinafter referred to as an "FC automobile 10" or a "vehicle 10") to which a fuel cell system 12 (hereinafter referred to as an "FC system 12") serving as the fuel cell system with a load driven by two power sources according to the embodiment of the present disclosure is applied.

Figure 2:
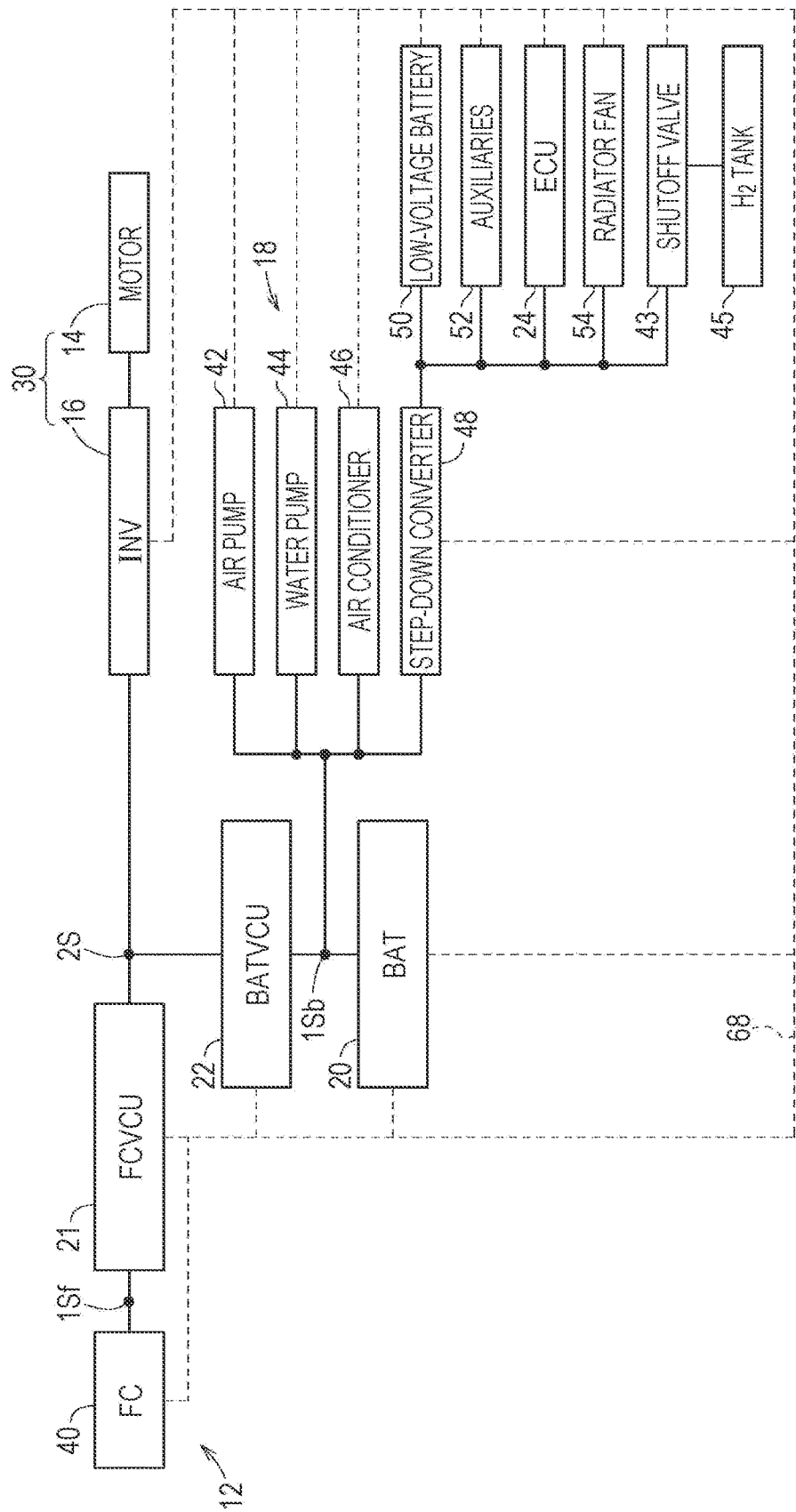
FIG. 2 is a block diagram of an electrical power system of the fuel cell automobile.

FIG. 2 is a block diagram of an electrical power system of the FC automobile 10. As illustrated in FIG. 1 and FIG. 2, the FC automobile 10 includes the FC system 12, a drive motor 14 (hereinafter referred to as a "motor 14"), and a load driving circuit 16 (hereinafter referred to as an "inverter (INV) 16").

The FC system 12 basically includes a fuel cell unit 18 (hereinafter referred to as an "FC unit 18"), a high-voltage battery 20 (hereinafter referred to as a "BAT 20") (electrical storage device), a step-up chopper converter 21 (hereinafter referred to as an "FCVCU 21") serving as a fuel-cell-side converter, a bidirectional step up-down chopper converter 22 (hereinafter referred to as a "BATVCU 22") serving as an electrical-storage-device-side converter, and an electronic control unit 24 (hereinafter referred to as an "ECU 24"). The FC unit 18 is disposed at one primary side 1Sf. The BAT 20 is disposed at the other primary side 1Sb. The FCVCU 21 is disposed between the primary side 1Sf and a secondary side 2S. The BATVCU 22 is disposed between the primary side 1Sb and the secondary side 2S.

The FCVCU 21 basically steps up FC voltage (also referred to as power generating voltage) Vfc, which is one primary voltage, to load end voltage (load driving circuit input end voltage) Vinv, which is secondary voltage.

The BATVCU 22 basically steps up BAT voltage (also referred to as battery voltage) Vbat, which is the other primary voltage, to the load end voltage Vinv, which is the secondary voltage, or steps down the load end voltage Vinv to the BAT voltage Vbat. The BATVCU 22 may be a unidirectional step-up converter that steps up the BAT voltage Vbat to the load end voltage Vinv.

Although the ECU 24 is practically divided into a general ECU (not illustrated) that controls energy management of the entire FC automobile 10 in a centralized manner, a converter ECU (not illustrated) that controls the FCVCU 21 and the BATVCU 22 in accordance with an instruction from the general ECU, and an FCECU (not illustrated) that controls the FC unit 18, the ECUs are integrated as one ECU 24 for convenience in the present embodiment. The ECUs are capable of sharing data and so on with each other through in-vehicle communication.

The motor 14 generates driving force on the basis of the power supplied from an FC 40 and the BAT 20 and rotates wheels 28 via a transmission 26 using the driving force.

The INV 16 has a three-phase bridge structure. The INV 16 performs direct current-alternating current conversion to convert the load end voltage Vinv [V], which is direct current voltage, into three-phase alternating current voltage and supplies the three-phase alternating current voltage to the motor 14. In addition, the INV 16 steps down the load end voltage Vinv after alternating current-direct current conversion involved in a regeneration operation of the motor 14 via the BATVCU 22 and supplies the stepped-down load end voltage Vinv to the BAT 20 (charges the BAT 20 with the stepped-down load end voltage Vinv).

A permanent magnet synchronous motor (PM motor) is adopted as the motor 14 in the present embodiment. In this case, field-weakening control may be applied in order to increase a number of revolutions Nm of the motor 14 at a certain torque.

The motor 14 and the INV 16 are collectively referred to as a load 30. The load 30 may practically include components including the BATVCU 22, an air pump 42, a water pump 44, an air conditioner 46, and a step-down converter 48, in addition to the motor 14 and so on. The air pump 42, the water pump 44, and the air conditioner 46 are high-voltage auxiliary loads and power is supplied from the fuel cell stack 40 (hereinafter referred to as the "FC 40" or the "FC stack 40") and/or the BAT 20 to the air pump 42, the water pump 44, and the air conditioner 46.

The FC unit 18 includes the FC 40, a hydrogen tank ($H_2$ tank) 45, the air pump 42, and the water pump 44. The hydrogen tank 45 supplies hydrogen (fuel gas) to an anode channel of the FC 40 via a shutoff valve 43. The air pump 42 supplies air (oxidant gas) including oxygen to a cathode channel of the FC 40. The water pump 44 supplies cooling medium (refrigerant) to a cooling channel of the FC 40.

The FC 40 has, for example, a structure in which fuel battery cells each including an electrolyte membrane sandwiched between an anode electrode and a cathode electrode are deposited. Hydrogen containing gas supplied to the anode electrode via the anode channel is subjected to hydrogen ionization on electrode catalyst and moves to the cathode electrode via the electrolyte membrane. Electrons generated during the movement are extracted into external circuits and are used as electrical energy generating the direct current voltage Vfc (hereinafter referred to as the power generating voltage Vfc, the fuel cell voltage Vfc, or the FC voltage Vfc). Since the oxygen containing gas is supplied to the cathode electrode via the cathode channel, the hydrogen ion, the electrons, and the oxygen gas react in the cathode electrode to produce water.

The power from the FC 40 (hereinafter referred to as "FC power Pfc": Pfc=Vfc×Ifc (Ifc: FC current)) is supplied to the INV 16 and the motor 14 with the FC voltage Vfc stepped up or set to the direct connection state via the FCVCU 21 (during powering), is supplied to the auxiliaries including the air pump 42 depending on the power status in the FC system 12 with the FC voltage Vfc stepped down via the BATVCU 22, is supplied to the BAT 20 for charge, and is supplied to a low-voltage battery 50 and so on via the step-down converter 48.

The power from the BAT 20 (hereinafter referred to as "BAT power Pbat") is supplied to the INV 16 and the motor 14 with the BAT voltage Vbat stepped up or set to the direct connection state via the BATVCU 22 (during the powering), is supplied to the auxiliaries including the air pump 42 depending on the power status in the FC system 12, and is supplied to the low-voltage battery 50 and so on via the step-down converter 48.

The power of the low-voltage battery 50 is supplied to auxiliaries 52 including lights, accessories, and various sensors, which are driven with low voltage, the ECU 24, a radiator fan 54, and the shutoff valve 43 of the hydrogen tank 45.

The BAT 20 is an electrical storage device (energy storage) including multiple battery cells. For example, a lithium ion secondary battery, a nickel-metal-hydride secondary battery, or a capacitor may be used as the BAT 20. The lithium ion secondary battery is used as the BAT 20 in the present embodiment.

As illustrated in FIG. 1, the FCVCU 21 includes a reactor (inductor) 21a; a switching element 21b, such as a metal oxide semiconductor field effect transistor (MOSFET) or an insulated gate bipolar transistor (IGBT); a diode 21c (unidirectional current passing element); a smoothing capacitor C1f disposed at the primary side 1Sf; and a smoothing capacitor C2f disposed at the secondary side 2S. The switching element 21b is set to a switching state (duty control) by the ECU 24 functioning as a converter controller via a communication control line 68 to step up the FC voltage Vfc to a certain load end voltage Vinv.

When the duty (driving duty) is set to 0[%] and the switching element 21b is kept in an off state (open state), the FC 40 is directly connected to the load 30 (referred to as an FC direct connection state or an FCVCU direct connection state) via the reactor 21a and the diode 21c and the FC voltage Vfc is directly connected to the load end voltage Vinv (Vinv=Vfc−Vd≈Vfc, Vd<Vfc, Vd: forward drop voltage of the diode 21c). The diode 21c operates for voltage step-up or direct connection and for backflow prevention. Accordingly, the FCVCU 21 performs the backflow prevention operation and the direct connection operation (for example, during the powering), in addition to the voltage step-up operation (for example, during the powering).

The BATVCU 22 includes a reactor 22a; switching elements 22b and 22d, such as MOSFETs or IGBTs; diodes 22c and 22e connected in parallel to the switching elements 22b and 22d, respectively; a smoothing capacitor C1b disposed at the primary side 1Sb; and a smoothing capacitor C2b disposed as the secondary side 2S.

During the voltage step-up, the switching element 22d is set to the off state and the switching element 22b is switched on (duty control) by the ECU 24 to step up the BAT voltage Vbat (storage voltage) to a certain load end voltage Vinv (during the powering).

During the voltage step-down, the switching element 22b is set to the off state and the switching element 22d is switched on (duty control) by the ECU 24 to step down the load end voltage Vinv to the BAT voltage Vbat of the BAT 20 (during regeneration charge and/or during charge by the FC 40). In this case, the diode 22c functions as a fly-wheel diode.

When the switching element 22b is set to the off state at the duty 0[%] and the switching element 22d is set to an on state at the duty 100[%], the BAT 20 is directly connected to the load 30 (referred to as a BAT direct connection state or a BATVCU direct connection state: during the powering, during the charge, or during the driving of the auxiliary loads and so on).

In the BAT direct connection state, the BAT voltage Vbat of the BAT 20 is substantially equal to the load end voltage Vinv (Vbat≈Vinv). Practically, the load end voltage Vinv during the powering by the BAT 20 in the BAT direct connection state is equal to "Vbat−the forward drop voltage of the diode 22e" and the load end voltage Vinv during the charge (including the regeneration) is equal to "Vinv=Vbat+the on voltage of the switching element 22d=Vbat (provided that the on voltage of the switching element 22d is 0[V]).

Figure 3:
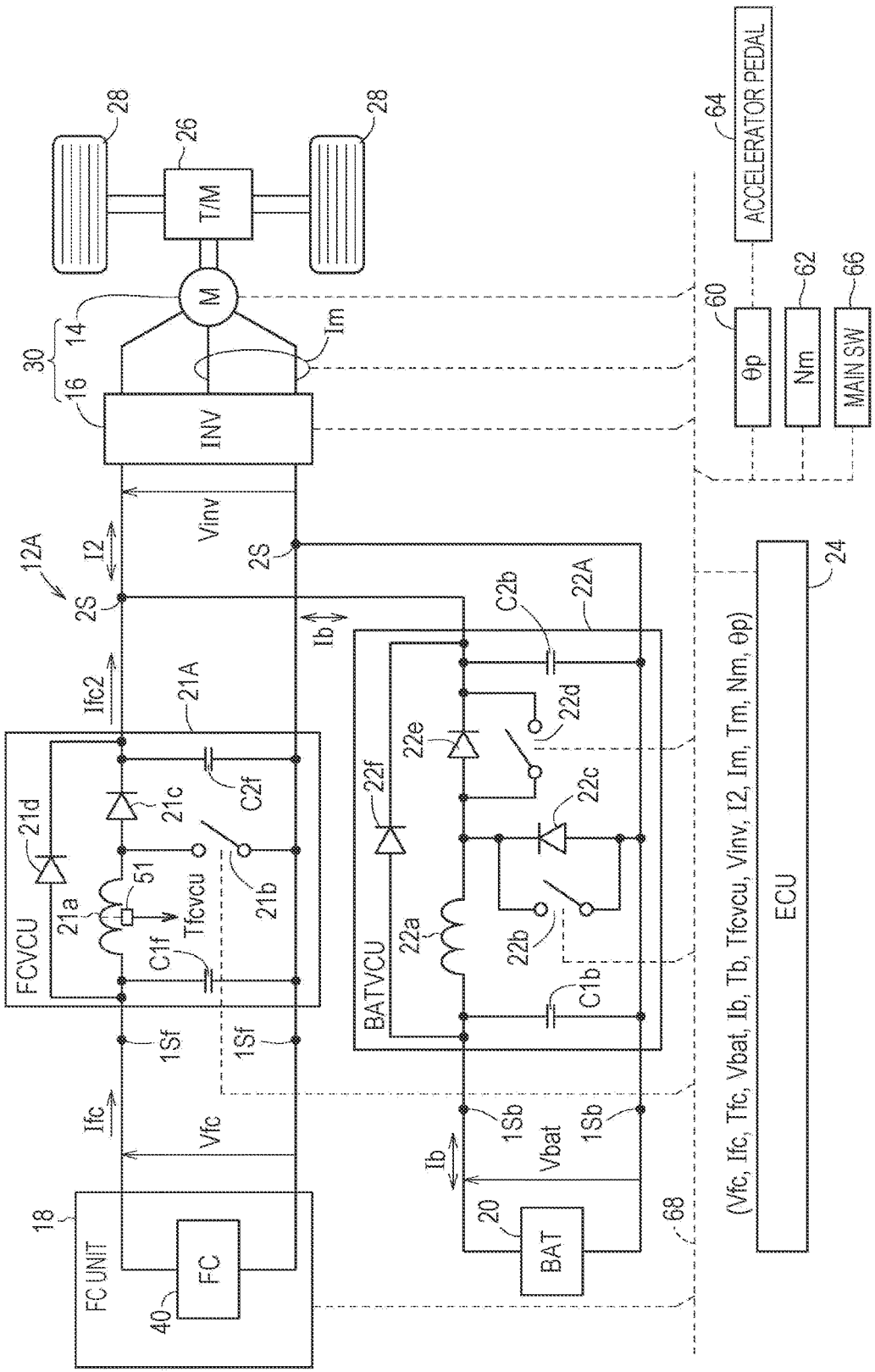
FIG. 3 schematically illustrates an example of the entire configuration of a fuel cell automobile to which a fuel cell system according to a modification is applied.

As illustrated in a modification in FIG. 3, an FC automobile 10A including a FC system 12A may be adopted. In the FC automobile 10A, a bypass diode 21d is connected in parallel to a series circuit including the reactor 21a and the diode 21c in order to prevent an occurrence of a voltage drop caused by the resistance component of the reactor 21a and the FC current Ifc during the direct connection operation (in the direct connection state) of an FCVCU 21A. Similarly, a bypass diode 22f is connected in parallel to a series circuit including the reactor 22a and the diode 22e in order to prevent an occurrence of a voltage drop caused by the resistance component of the reactor 22a and BAT current (battery current) Ib in the BAT direct connection state (during the direct connection operation (in the direct connection state) of a BATVCU 22A).

Figure 4:
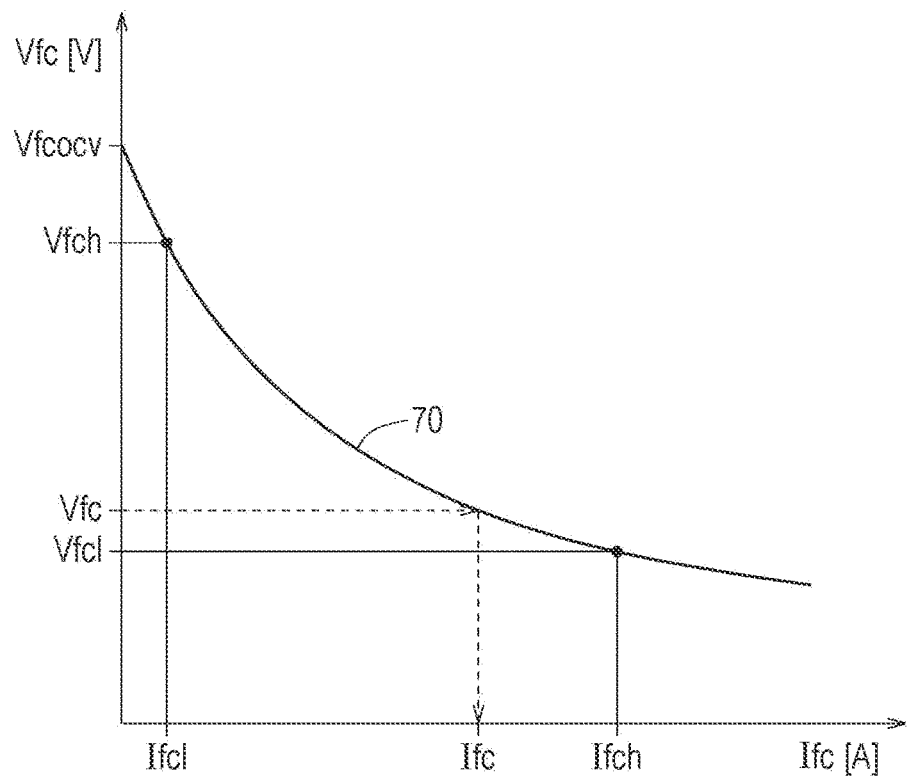
FIG. 4 is a graph illustrating an IV characteristic of a fuel cell.

As illustrated in FIG. 4, the FC 40 has known current voltage (IV) characteristic 70 in which the FC current Ifc is increased as the FC voltage Vfc is decreased from FC open circuit voltage Vfcocv. Specifically, FC current Ifcl at FC voltage Vfcl at which the FC voltage Vfc is relatively low is larger than FC current Ifcl at FC voltage Vfch at which the FC voltage Vfc is relatively high. The FC power Pfc is increased with the increasing FC current Ifc (with the decreasing FC voltage Vfc).

In the direct connection state of the FCVCU 21, the FC voltage Vfc of the FC 40 is controlled by the load end voltage Vinv (instructed voltage (target voltage) of the BATVCU 22) determined by a step-up ratio (Vinv/Vbat) of the BATVCU 22 in the step-up state (switching state) and, upon determination of the FC voltage Vfc, the FC current Ifc is controlled (determined) along the IV characteristic 70.

In the step-up state of the FCVCU 21, the voltage at the primary side 1Sf of the FCVCU 21, that is, the FC voltage Vfc is set as the instructed voltage (target voltage) of the FCVCU 21, the FC current Ifc is determined along the IV characteristic 70, and a step-up ratio (Vinv/Vfc) of the FCVCU 21 is determined so as to generate a desired load end voltage Vinv.

In the direct connection state of the BATVCU 22 during the regeneration, the FC voltage Vfc of the FC 40 is set as the instructed voltage (target voltage) of the FCVCU 21, the step-up ratio (Vinv/Vfc) of the FCVCU 21 is determined so as to be varied with the variation in the load end voltage Vinv, and the FC current Ifc is controlled (determined) along the IV characteristic 70.

In the direct connection state of the BATVCU 22 during the powering, the FC voltage Vfc of the FC 40 is set as the instructed voltage (target voltage) of the FCVCU 21, the step-up ratio (Vinv/Vfc) of the FCVCU 21 is determined so as to be varied with the variation in the load end voltage Vinv, and the FC current Ifc is controlled (determined) along the IV characteristic 70.

Feedback (F/B) control is performed for the FCVCU 21 in the present embodiment, in which the duty of the switching element 21b is adjusted by the ECU 24 serving as the converter controller so that the FC voltage Vfc has an instructed value (set value or target value) in the voltage step-up. However, since unique relationship based on the IV characteristic 70 is established between the FC voltage Vfc and the FC current Ifc, feedback (F/B) control may be performed in which the duty of the switching element 21b is adjusted by the ECU 24 so that the FC current Ifc has an instructed value (set value or target value).

In the above control, programs stored in a memory (read only memory (ROM)) in the ECU 24 are executed and the values detected by various sensors are used. The values detected by the various sensors include the FC voltage Vfc of the FC 40, the FC current Ifc, an FC temperature Tfc (for example, the temperature of the refrigerant flowing through the water pump 44), the BAT voltage Vbat of the BAT 20, the BAT current Ib, a battery temperature Tb, the load end voltage Vinv of the INV 16, secondary current I2, motor current Im, and a motor temperature Tm.

The various sensors include an element temperature sensor 51, such as a thermistor, which estimates (substitution measurement) a resistance component (also simply referred to as resistance) Rfcvcu [Ω] of the FCVCU 21 and which is provided near the reactor 21a, in addition to the above sensors. The element temperature sensor 51 primarily collectively detects the element temperatures of the switching element 21b, the reactor 21a, the diode 21c, the smoothing capacitors C1f and C2f, and lines composing the FCVCU 21 as an element temperature Tfcvcu [° C.].

Figure 5:
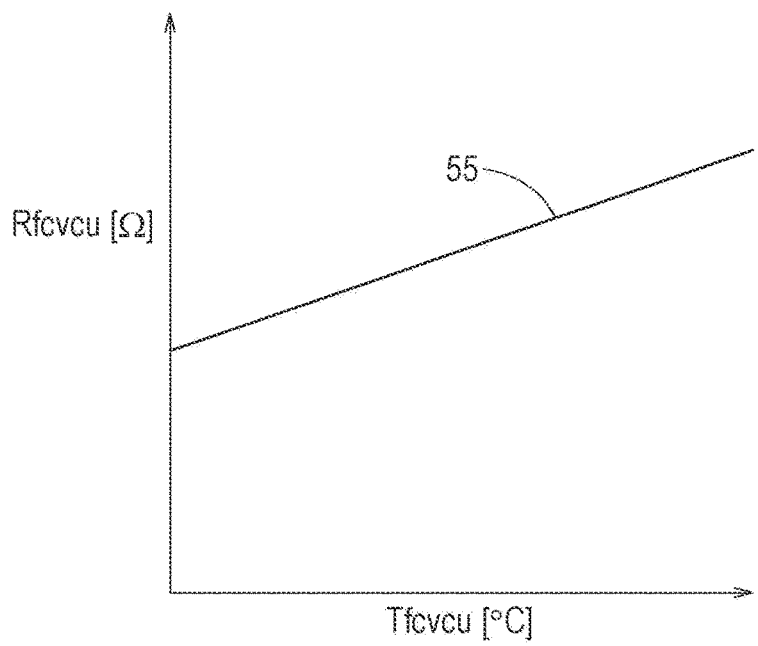
FIG. 5 is a characteristics diagram illustrating the relationship between an element temperature and a resistance component of a fuel-cell-side converter.

FIG. 5 is a characteristics diagram illustrating the relationship between the element temperature Tfcvcu that is measured in advance and that is stored in the memory (storage device) in the ECU 24 and the resistance component Rfcvcu of the FCVCU 21. A characteristic 55 is illustrated in FIG. 5, in which the resistance component Rfcvcu [Ω] is increased and decreased in proportion to the element temperature Tfcvcu [°C.], as in metal such as copper. Multiplication of the resistance component Rfcvcu by the FC current Ifc allows a voltage drop ΔVfcvcu (ΔVfcvcu=Rfcvcu×Ifc) of the FCVCU 21 at the current element temperature Tfcvcu to be estimated (calculated).

The various sensors also include a position sensor 60 and a number-of-revolutions-of-motor sensor 62 (refer to FIG. 1), in addition to the above sensors. The position sensor 60 detects the degree of opening θp [deg] of an accelerator pedal 64. The number-of-revolutions-of-motor sensor 62 detects the number of revolutions of the motor 14 (hereinafter referred to as the "number of revolutions of the motor Nm" or the "number of revolutions Nm") [rpm].

The ECU 24 detects a vehicle speed V [km/h] of the FC automobile 10 on the basis of the number of revolutions Nm. Although the number-of-revolutions-of-motor sensor 62 also serves as a vehicle speed sensor in the FC automobile 10, the vehicle speed sensor may be separately provided.

A main switch 66 (hereinafter referred to as a "main SW 66") is also connected to the ECU 24. The main SW 66 corresponds to an ignition switch of an internal combustion engine automobile. The main SW 66 is used to switch between supply of power from the FC unit 18 to the motor 14 and supply of power from the BAT 20 to the motor 14. The main SW 66 is capable of being operated by a user. The FC 40 is in a power generation state when the main SW 66 is turned on and the FC 40 is in a power generation stop state when the main SW 66 is turned off.

The ECU 24 is a calculating machine including a microcomputer. The ECU 24 includes a central processing unit (CPU), a read only memory (ROM) (including an electrically erasable and programmable ROM (EEPROM)), a random access memory (RAM), input-output units including an analog-to-digital (A/D) converter and a digital-to-analog (D/A) converter, a timer serving as a time register, and so on. The CPU reads out the programs stored in the ROM and executes the programs to cause the ECU 24 to function as various function realizing components including a controller, an arithmetic portion, and a processor.

As described above, the ECU 24 may not be composed of one ECU and may be composed of multiple ECUs including an ECU for the motor 14, an ECU for the FC unit 18, an ECU for the BAT 20, an ECU for the FCVCU 21, an ECU for the BATVCU 22, and a general ECU. Necessary data is shared between the multiple ECUs via an in-vehicle communication line (not illustrated).

The ECU 24 determines the load to be allocated the FC 40, the load to be allocated to the BAT 20, and the load to be allocated to the regeneration power source (the motor 14) from the loads requested for the FC system 12 as the entire FC automobile 10, which are determined on the basis of the inputs (load requests) from the various switches and the various sensors, in addition to the state of the FC 40, the state of the BAT 20, and the state of the motor 14, and supplies instructions to the motor 14, the INV 16, the FC unit 18, the BAT 20, the FCVCU 21, and the BATVCU 22.

Figure 6:
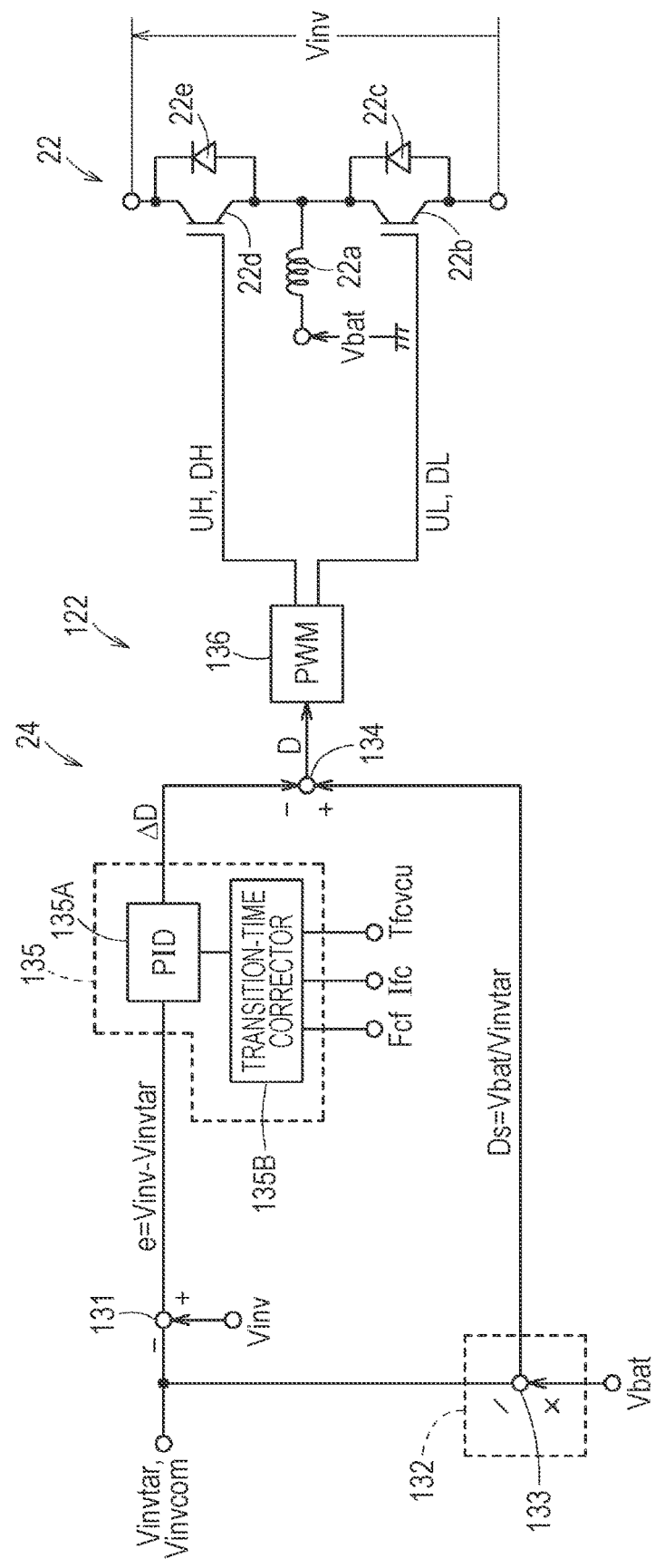
FIG. 6 is a functional block diagram including an electrical-storage-device-side converter and a drive control unit for the electrical-storage-device-side converter.

FIG. 6 is a functional block diagram including the BATVCU 22 and a drive control unit 122 for the BATVCU 22 in the ECU 24 in a load end voltage Vinv control mode when the BATVCU 22 is in the step-up state.

When the FCVCU 21 is in the direct connection state, the load end voltage Vinv is used as the FC voltage Vfc and the FC voltage Vfc of the FC 40 is controlled by the BATVCU 22 driven by the drive control unit 122 (referred to as an FC direct connection Vinv control mode).

In the FC direct connection Vinv control mode, a load end voltage instructed value Vinvcom calculated by the ECU 24 is supplied to a calculation point 131 (subtractor) as a subtraction signal (subtrahend signal) and is supplied to a calculation point 133 in a feedforward portion 132 as a division signal. The load end voltage instructed value Vinvcom is used as target load end voltage Vinvtar (Vinvtar=Vinvcom).

The load end voltage Vinv detected (measured) by a voltage sensor (not illustrated) is supplied to the calculation point 131 as an addition signal (minuend signal).

The BAT voltage Vbat detected (measured) by a voltage sensor (not illustrated) is supplied to the calculation point 133 (ratio generator) as a multiplication signal (multiplier signal).

A deviation e (e=Vinv−Vinvtar) output from the calculation point 131 is supplied to a feedback (F/B) portion 135.

The F/B portion 135 includes a proportional (P) integral (I) differential (D) operator (PID operator) 135A and a transition-time corrector 135B for the PID operator 135A.

The F/B portion 135 converts the deviation e into correction duty ΔD, which is a correction value of the duty, and supplies the correction duty ΔD to one input of a calculation point 134 (subtractor) as a subtrahend signal. It is sufficient for the F/B portion 135 to function as at least the proportional (P) operator and the integral (I) operator.

The correction duty ΔD is a value resulting from combination of correction duty ΔDp caused by a P term component (proportional term) of the feedback, correction duty ΔDi caused by an I term component (integral term) of the feedback, and correction duty ΔDd caused by a D term component (differential term) of the feedback. The correction duty ΔD without the correction by the transition-time corrector 135B is represented by Equation (1):

$$\Delta D = \Delta Dp + \Delta Di + \Delta Dd \qquad (1)$$

$$= Kp \times e + Ki \times \int e\, dt + Kd \times (de/dt)$$

In Equation (1), Kp denotes a feedback coefficient of the proportional term with respect to the deviation e, Ki denotes a feedback coefficient of the integral term with respect to the deviation e, and Kd denotes a feedback coefficient of the differential term with respect to the deviation e.

Reference duty Ds (Ds=Vbat/Vinvtar) is supplied to the other input of the calculation point 134 from the calculation point 133.

Duty (driving duty) D in Equation (2), which results from subtraction of the correction duty ΔD from the reference duty Ds, is supplied to a pulse width modulation (PWM) processor 136:

$$D = Ds - \Delta D = Vbat/Vinvtar - \Delta D \quad (2)$$

The PWM processor 136 supplies a driving signal UH of driving duty DH in Equation (3) to the switching element 22*d* (also referred to as an upper arm switching element) on the basis of the driving duty D and supplies a driving signal UL of driving duty DL in Equation (4) to the switching element 22*b* (also referred to as a lower arm switching element) on the basis of the driving duty D:

$$DH = Vbat/Vinvtar - \Delta D \quad (3)$$

$$DL = 1 - (Vbat/Vinvtar - \Delta D) \quad (4)$$

The BATVCU 22 is driven by the ECU 24 in the above manner so that the load end voltage Vinv coincides with the target load end voltage Vinvcom.

The step-up ratio (Vinv/Vbat) of the BATVCU 22 is represented by Equation (5). As apparent from Equation (5), when the BAT voltage Vbat, which is the primary-side voltage, has a constant value, increasing the driving duty D so as to be close to one allows the load end voltage Vinv, which is the secondary-side voltage, to be increased. In addition, when the BAT voltage Vbat has a constant value, increasing the correction duty $\Delta D$ allows the load end voltage Vinv to be decreased.

$$Vinv/Vbat = 1/(1-D) = 1/\{1-(Ds-\Delta D)\} \quad (5)$$

Figure 7:
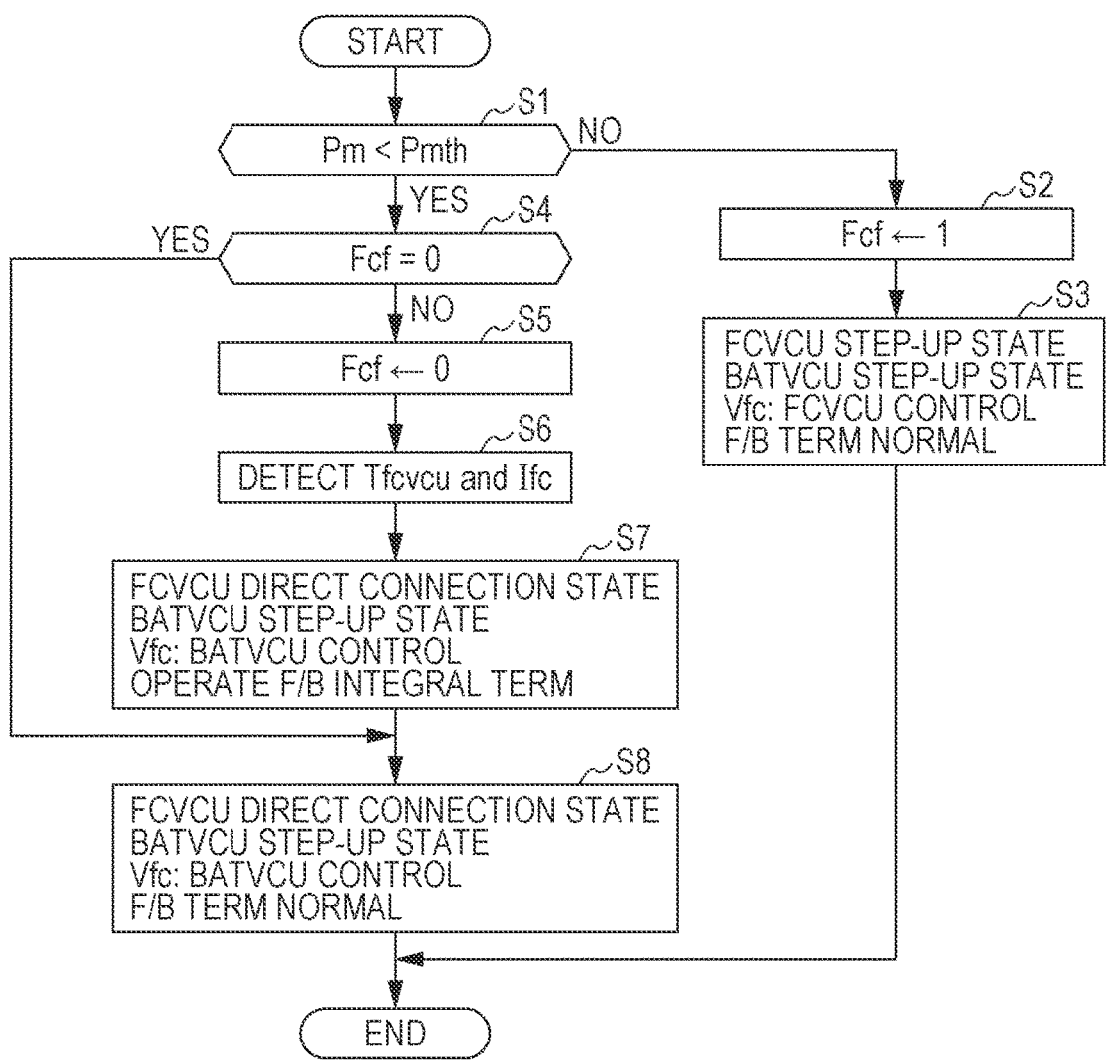
FIG. 7 is a flowchart describing an operation of the present embodiment.

An exemplary control operation process will now be described with reference to a flowchart in FIG. 7 and a timing chart in FIG. 8. The control operation process in FIG. 7 is performed by the ECU 24 in the FC automobile 10 to which the FC system 12 including the F/B portion 135 including the transition-time corrector 135B, which is a main component in the present embodiment, is applied. In the timing chart in FIG. 8, the variations with time of the motor load Pm, the FCVCU state flag Fcf, and the target load end voltage Vinvtar are the same as those illustrated in the timing chart in FIG. 10.

Referring to FIG. 7, in Step S1, the ECU 24 determines whether the motor load Pm is lower than the threshold power Pmth.

When the motor load Pm is higher than the threshold power Pmth during the time period from the time t0 to the time t2 (NO in Step S1), in Step S2, the ECU 24 sets the FCVCU state flag Fcf to one (Fcf=1) (Fcf←1) indicating the FCVCU step-up state.

In the FCVCU step-up state when the FCVCU state flag Fcf=1, in Step S3, the FC voltage Vfc of the FC 40 is controlled by the ECU 24 via the FCVCU 21 in the step-up state. The ECU 24 controls the step-up ratio (Vinv/Vfc) between the FC voltage Vfc and the load end voltage Vinv so that the FC voltage Vfc of the FC 40 reaches target FC voltage Vfctar. As a result, the FC power Pfc is controlled so as to reach target FC power Pfctar. Since the motor 14 is generally in the high-load state when the FCVCU 21 is in the step-up state and the FC 40 operates in a high-power state (a state in which the FC voltage Vfc is low and the FC current Ifc is large), the element temperature Tfcvcu of the FCVCU 21 also tends to be high.

In Step S3, the ECU 24 steps up the BAT voltage Vbat via the BATVCU 22 so that the load end voltage Vinv reaches the target load end voltage Vinvtar. When the control is performed by the FCVCU 21 or the BATVCU 22 in the step-up state, the ECU 24 does not correct the feedback coefficients Kp, Ki, and Kd of the BATVCU 22 indicated in Equation (1) (F/b term normal).

When the motor load Pm starts to be decreased at the time t1 and is gradually decreased during the time period from the time t1 to the time t2, the load end voltage Vinv is decreased via the BATVCU 22 in Step S3. Since the target FC power Pfctar is decreased in response to the decrease in the load end voltage Vinv, the FC voltage Vfc is gradually increased via the FCVCU 21 to make the FC power Pfc close to the target FC power Pfctar.

When the motor load Pm coincides with the threshold power Pmth at the time t2 and, then, the motor load Pm becomes lower than the threshold power Pmth, the determination in step S1 is affirmative (YES in Step S1) (Pm<Pmth).

In this case, in Step S4, the ECU 24 determines whether the FCVCU state flag Fcf is set to zero (Fcf=0) (in the FCVCU 21 direct connection state). Since the FCVCU state flag Fcf is equal to one (Fcf=1) (in the FCVCU 21 step-up state) during the time period from the time t0 to the time t2, the determination in Step S4 is negative (NO in Step S4). In Step S5, the ECU 24 switches the FCVCU state flag Fcf from the FCVCU step-up state (Fcf=1) to the FCVCU direct connection state (Fcf=0) (Fcf←0).

Simultaneously with this, in Step S6, the ECU 24 detects the element temperature Tfcvcu of the FCVCU 21 with the element temperature sensor 51 and detects the FC current Ifc with a current sensor (not illustrated).

In Step S7, the ECU 24 performs transition time processing from the step-up state to the direct connection state of the FCVCU 21 for the BATVCU 22. In the transition time processing, an initial value of the feedback integral term is set.

In order to prevent the FC power Pfc from sharply decreasing from the target FC power Pfctar at the time t2 (in order to prevent a power difference $\Delta Pfc$ from occurring), it is necessary to control the load end voltage Vinv set by the BATVCU 22 (the FC voltage Vfc) so as not to be sharply increased (not to be non-linearly increased, that is, not to cause the voltage difference $\Delta Vfc$) but to be linearly increased.

When the FCVCU 21 is in the direct connection state (when the switching element 21*b* is switched off at the duty 0[%]), the resistance component Rfcvcu of the FCVCU 21 described above with reference to FIG. 5 exists and the voltage drop $\Delta Vfcvcu$ due to the resistance component Rfcvcu and the FC current Ifc occurs.

Accordingly, in the transition time processing in Step S7, the driving duty D (D=Ds−$\Delta D$) is corrected so that the target load end voltage Vinvtar is decreased by the voltage drop $\Delta Vfcvcu$ to prevent the voltage difference $\Delta Vfc$ from occurring in the FC voltage Vfc. In other words, the voltage difference $\Delta Vfc$ corresponds to the voltage drop $\Delta Vfcvcu$.

In order to perform the correction so as to decrease the target load end voltage Vinvtar by the voltage difference $\Delta Vfc$, the step-up ratio Vinv/Vbat of the BATVCU 22 is reduced by the amount corresponding to the voltage difference $\Delta Vfc$ according to Equation (5) described above. To this end, the correction duty $\Delta D$ is increased by the amount corresponding to the voltage difference $\Delta Vfc$ in the transition.

Figure 8:
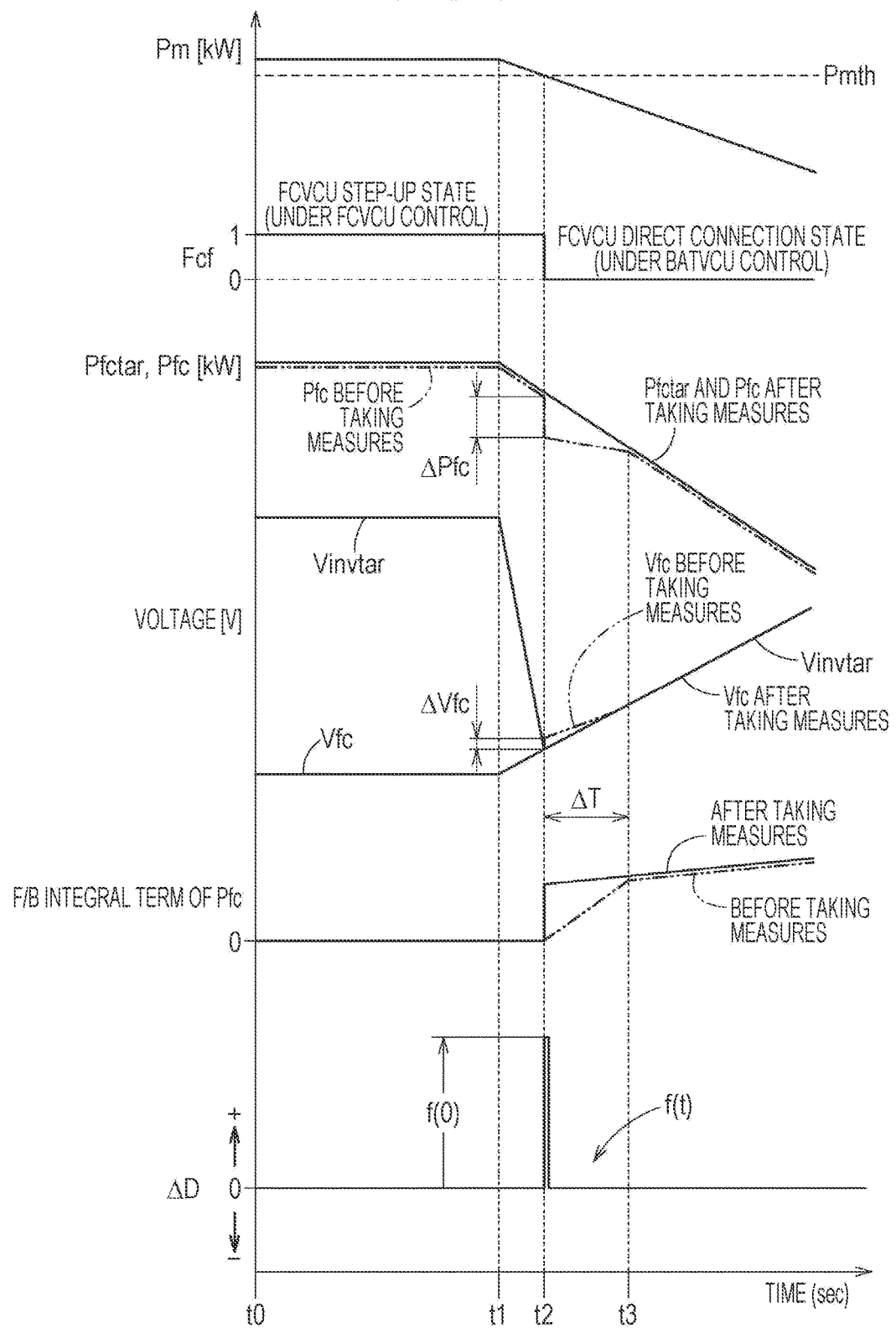
FIG. 8 is a timing chart describing the operation of the present embodiment.

As indicated in the bottom in FIG. 8, an impulse increase of the correction duty $\Delta D$ for the correction only at the time t2 (the transition time) (the correction of the correction duty $\Delta D$) is achieved by, for example, setting the initial value for the correction duty $\Delta Di$ of the integral term of the PID operator 135A determined by the transition-time corrector 135B. In a correction function f(t) to cause the impulse increase of the correction duty $\Delta Di$ of the integral term, an initial value f(0) of the feedback integral term $Ki \times \int edt$ is set to f(t2) (f(0)=f(t2)) and the initial value f(0)=f(t2) is subjected to the impulse increase from zero at the time t2 and, then, returns to zero.

Figure 9:
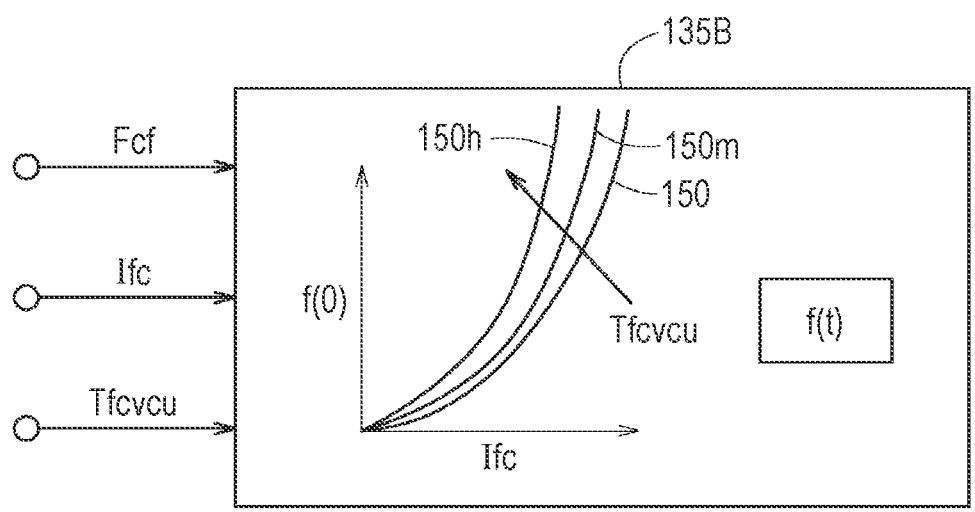
FIG. 9 schematically illustrates an exemplary configuration of a transition-time corrector.

The transition-time corrector 135B is composed of the correction function f(t) and a table (map) including characteristics 150, 150m, and 150h for calculating the initial value f(0) of the feedback integral term Ki×∫edt, as illustrated in FIG. 9.

As illustrated in FIG. 5, the resistance component Rfcvcu [Ω] of the FCVCU 21 is proportional to the element temperature Tfcvcu [° C.]. Accordingly, the difference (the voltage difference ΔVfc=Rfcvcu×Ifc) is increased if the element temperature Tfcvcu [° C.] is increased even with the same FC current Ifc.

In order to prevent the difference from being increased, the characteristics 150, 150m, and 150h are stored in the memory (storage device) in the ECU 24 in advance. In the characteristics 150, 150m, and 150h, the initial value f(0) is increased with the increasing FC current Ifc and the initial value f(0) is increased with the increasing element temperature Tfcvcu even with the same FC current Ifc. Here, the element temperature Tfcvcu is used as a parameter.

In this case, before taking measures, since the voltage difference ΔVfc exists at the time t2 in FIG. 8, the amount of contribution of the feedback integral term Ki×∫edt to the FC power Pfc is gradually increased for a certain time Δt and converges at the time t3 to enter the stable state, as illustrated by a two-dot chain line from the time t2 to the time t3. Accordingly, the power difference ΔPfc has occurred between the target FC power Pfctar and the FC power Pfc.

In contrast, after taking measures in which the initial value f(0) the feedback integral term Ki×∫edt is varied by the amount corresponding to the voltage drop ΔVfcvcu in the transition, the amount of contribution of the feedback integral term Ki×∫edt to the FC power Pfc is calculated by adding (combining) a correction term {f(0)×∫edt} to (with) the feedback integral term Ki×∫edt before taking measures, as indicated in Equation (6). Accordingly, as illustrated by a solid line in FIG. 8, the feedback integral term Ki×∫edt of the FC power Pfc is increased in a stepwise manner and immediately enters the stable state.

$$\{ki + f(t)\} \int edt = Ki \times \int edt + f(t) \times \int edt \quad (6)$$
$$= Ki \times \int edt + f(0) \times \int edt$$

In this case, when the FCVCU state flag Fcf is varied from the value one to the value zero, that is, when the FCVCU state flag Fcf=0 is supplied, the transition-time corrector 135B calculates the initial value f(0), which is a function value, using the FC current Ifc detected in the transition as a variable with reference to the characteristic 150 (refer to FIG. 9) and sets the initial value f(0) in the PID operator 135A so as to generate the feedback integral term Ki×∫edt after taking measures using the correction term f(0)×∫edt, which is the second term of the right side in Equation (6).

The above control causes the correction duty ΔD to be additionally corrected only at the time t2 and, thus, the FC voltage Vfc after taking measures is smoothly increased without an occurrence of the voltage difference ΔVfc at the time t2, as illustrated in FIG. 8. As a result, the FC power Pfc after taking measures is smoothly decreased along the target FC power Pfctar.

It is preferred in the transition time processing in Step S7 that interpolation be performed using the characteristics 150, 150m, and 150h illustrated in FIG. 9 depending on the remaining amounts of the differences (the voltage difference ΔVfc and the power difference ΔPfc) in order to achieve further smoothness.

After Step S7, in Step S8, the feedback term is returned to the normal value illustrated in Equation (1) and the direct connection state of the FCVCU 21, the step-up state of the BATVCU 22, and the control of the FC voltage Vfc by the BATVCU 22 in the FC direct connection Vinv control mode are continued. Then, the process goes back to Step S1.

SUMMARY OF EMBODIMENTS

As described above, the FC system 12 according to the above embodiment includes the FC 40 outputting the FC voltage Vfc; the BAT 20 outputting the BAT voltage Vbat; the load 30; the FCVCU 21 serving as the fuel-cell-side converter, which applies the FC voltage Vfc to the load 30 in the direct connection state or steps up the FC voltage Vfc to apply the stepped-up FC voltage Vfc to the load 30; the BATVCU 22 serving as the electrical-storage-device-side converter, which steps up the BAT voltage Vbat and supplies the stepped up BAT voltage Vbat to the load 30; and the ECU 24 serving as the controller, which controls the operations of the FCVCU 21 and the BATVCU 22.

The ECU 24 controls the duty of the BATVCU 22 so that the FC voltage Vfc is subjected to smooth transition when the state in which the FC voltage Vfc is controlled via the FCVCU 21 is switched to the state in which the FCVCU 21 is set to the direct connection state and the FC voltage Vfc is controlled via the BATVCU 22.

As described above, in the fuel cell system 12, which is the fuel cell system with a load driven by two power sources in which the secondary side 2S of the FCVCU 21 the primary side 1Sf of which is connected to the FC 40 is connected to the secondary side 2S of the BATVCU 22 the primary side 1Sb of which is connected to the BAT 20 to drive the load 30, the driving duty D of the BATVCU 22=Ds−ΔD=Vbat/Vinvtar−ΔD (Equation (2)) is controlled so that the FC voltage Vfc is subjected to the smooth transition in the transition time in which the FCVCU 21 controlling the FC voltage Vfc in the step-up state is switched to the direct connection state and the FC voltage Vfc is to be controlled with the load end voltage Vinv, which is the secondary voltage of the BATVCU 22. This allows the linearity of the variation in the FC power Pfc to be kept when the FCVCU 21 is switched from the step-up state to the direct connection state. As a result, it is possible to ensure the continuous and stable control of the FC 40 near the transition time from the step-up state to the direct connection state of the FCVCU 21.

In this case, the driving duty D of the BATVCU 22 in the transition time is controlled in prospect of the voltage drop ΔVfcvcu (composed of the voltage drop caused by the resistance component of the reactor 21a, the diode 21c, and the lines and the FC current Ifc, and the forward voltage drop of the diode 21c) of the FCVCU 21 when the FCVCU 21 is switched to the direct connection state.

As illustrated by a top waveform in FIG. 8, when the motor load Pm becomes lower than the threshold power Pmth (at the time t2) while the FC power Pfc is gradually being decreased (refer to the waveform of a two-dot chain line of "Pfc before taking measures" in FIG. 8) in association with the gradual decrease of the motor load Pm from the time t1, the FCVCU 21 is switched from the state in which the driving duty D of the FCVCU 21 is controlled using the load end voltage Vinv as the reference voltage to set the FC voltage Vfc (the step-up state) to the direct connection state.

Since the FCVCU 21 in the direct connection state is not capable of controlling the FC voltage Vfc, the setting (control) of the FC voltage Vfc by the FCVCU 21 is switched to the setting (control) of the FC voltage Vfc by the BATVCU 22 at the time t2.

In this case, in the comparative example described above with reference to FIG. 10, since the FC voltage Vfc is set through the voltage step-up control of the BATVCU 22 using the BAT voltage Vbat as the reference voltage with no consideration of the voltage drop ΔVfcvcu of the FCVCU 21 at the time t2, the voltage difference ΔVfc occurs.

In other words, the differences in voltage (power) (the voltage difference ΔVfc and the power difference ΔPfc) corresponding to the voltage drop ΔVfcvcu caused by the resistance component Rfcvcu of the FCVCU 21 and the FC current Ifc have occurred in the comparative example.

In the present embodiment, the driving duty D of the BATVCU 22 is operated (controlled) only in the transition time in prospect of the voltage drop (the amount of change in voltage) ΔVfcvcu to remove the differences (the voltage difference ΔVfc and the power difference ΔPfc), thereby keeping the linearity of the gradual variation in the FC power Pfc when the FCVCU 21 is switched from the step-up state to the direct connection state.

Storing the voltage drop ΔVfcvcu of the FCVCU 21 in the memory (storage device) in the ECU 24 in advance in the form of the table indicating the characteristic 150 of the function value using the FC current Ifc as a variable allows the FC power Pfc to be subjected to more reliable and smooth transition in the transition time from the step-up state to the direct connection state of the FCVCU 21. In this case, the multiple characteristics 150, 150*m*, and 150*h* using the element temperature Tfcvcu as a parameter are stored in the storage device in consideration of the fact that the voltage drop ΔVfcvcu is increased with the increasing element temperature Tfcvcu of the FCVCU 21.

When the BATVCU 22 is driven via the F/B portion 135, which performs the PID processing at least including the proportional term and the integral term to the deviation e between the target load end voltage Vinvtar and the load end voltage Vinv (e=Vinv−Vinvtar), the amount corresponding to the voltage drop ΔVfcvcu is set as the initial value f(0) ∫edt of the integral term {Ki+f(t)} ∫edt in the transition time (the time t2) from the step-up state to the direct connection state of the FCVCU 21. The correction duty ΔD is instantaneously increased at the time t2 by the amount corresponding to the set amount and the load end voltage Vinv, which is the voltage at the secondary side 2S of the BATVCU 22, is instantaneously decreased by the amount corresponding to the voltage drop ΔVfcvcu. This allows the difference (the voltage difference ΔVfc) occurring at the time t2 to be offset. As a result, it is possible to reliably achieve the smooth transition of the FC power Pfc with the simple configuration.

In this case, the initial value f(0) ∫edt of the integral term {Ki+f(t)} ∫edt is varied with the variation in the element temperature Tfcvcu of the FCVCU 21 with reference to the characteristics 150, 150*m*, and 150*h* in FIG. 9. This allows the initial value f(0) ∫edt to be set in consideration of the element temperature Tfcvcu even if the element temperature Tfcvcu is varied with the variation in the load 30 (the INV 16 and the motor 14 driven via the INV 16). As a result, it is possible to reliably achieve the smooth variation in the FC power Pfc with the simple configuration in the transition time from the step-up state to the direct connection state of the FCVCU 21.

While the preferred embodiments of the present disclosure have been described above, it will be recognized and understood that various modifications can be made in the present disclosure on the basis of the content of the specification.

In a fuel cell system with a load driven by two power sources, in transition time from a relatively high-load state in which the fuel cell voltage is controlled by the fuel-cell-side converter to a relatively low-load state in which the fuel-cell-side converter is set to the direct connection state and the fuel cell voltage is controlled by the electrical-storage-device-side converter, an output-terminal voltage of the electrical-storage-device-side converter is set so as to be smoothly varied at the transition time.

However, even when the output-terminal voltage of the electrical-storage-device-side converter is set so as to be smoothly varied, problems have been found in that the fuel cell voltage (the fuel cell power) is not smoothly varied at the transition time, a difference in voltage (power) occurs, the linearity (following capability) of the variation in power of the fuel cell is deteriorated, and it is difficult to ensure continuous and stable control of the fuel cell.

Figure 10:
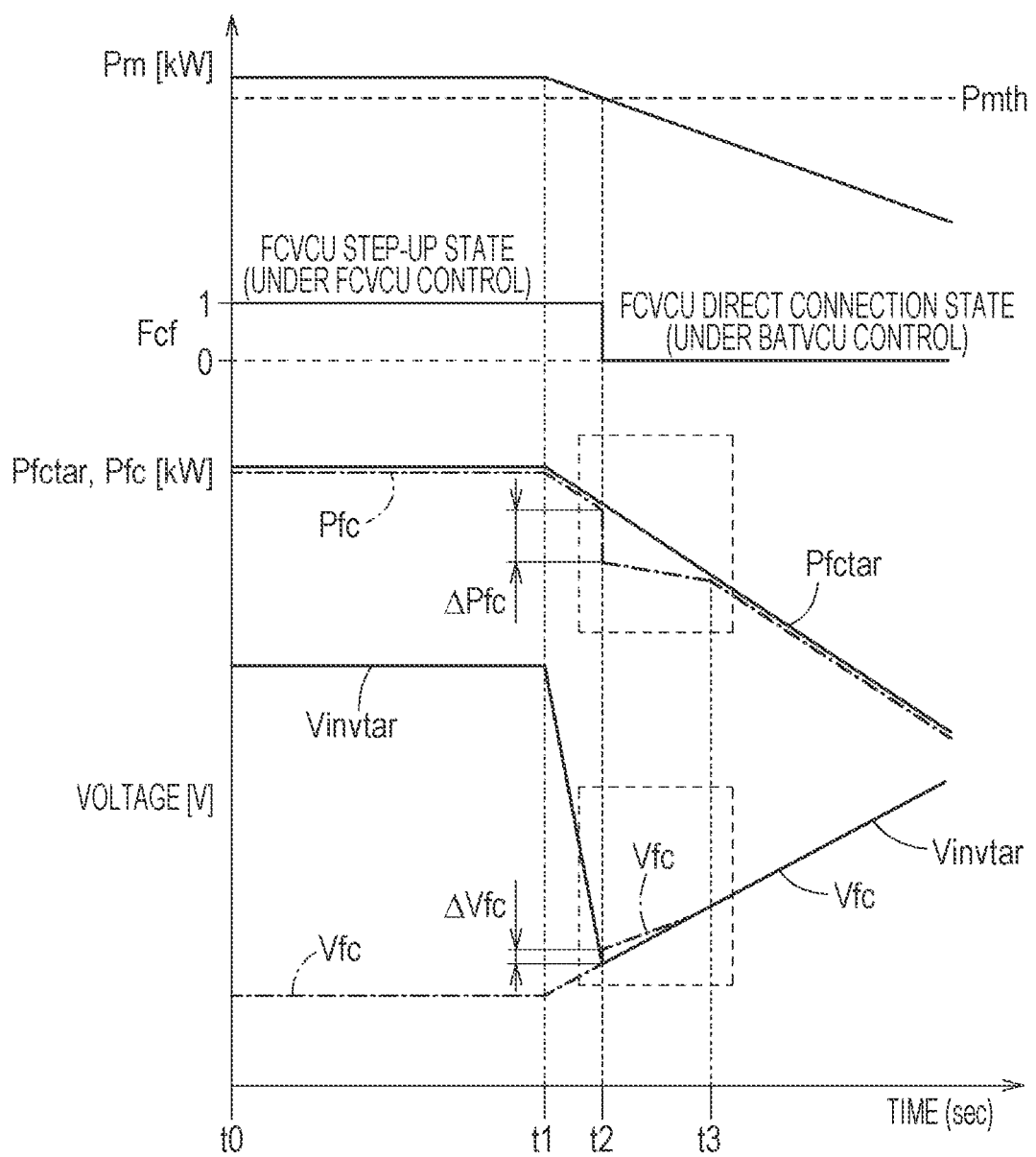
FIG. 10 is a timing chart in a comparative example for describing problems.

The above problems are specifically described with reference to a timing chart according to a modification of the present disclosure illustrated in FIG. 10. Referring to FIG. 10, when a motor load Pm, which is constant during a time period from a time t0 to a time t1, is gradually decreased since the time t1, target load end voltage Vinvtar is decreased and fuel cell voltage Vfc is increased from the time t1. The target load end voltage Vinvtar is a secondary-side voltage of a battery voltage control unit (BATVCU), which is the electrical-storage-device-side converter. The increase in the fuel cell voltage Vfc causes fuel cell current (fuel cell output current) Ifc to be decreased.

During a time period from the time t0 to a time t2, a fuel cell voltage control unit (FCVCU), which is the fuel-cell-side converter, is in the step-up state and the fuel cell voltage Vfc is controlled by the FCVCU, which is the fuel-cell-side converter.

When the motor load Pm becomes lower than a threshold power Pmth at the time t2, an FCVCU state flag Fcf indicating the step-up state or the direct connection state of the fuel-cell-side converter is switched from the FCVCU step-up state (Fcf=1) to the FCVCU direct connection state (Fcf=0).

The fuel cell voltage Vfc is controlled so as to be gradually increased by the FCVCU during the time period from the time t1 to the time t2 and the fuel cell voltage Vfc is controlled so as to be gradually increased by the BATVCU since the time t2. As illustrated by rectangle broken-line areas, at the time t2, which is the transition time, a difference (a voltage difference ΔVfc) occurs in the fuel cell voltage Vfc illustrated by a dotted-chain line. As a result, a difference (a power difference ΔPfc) occurs between the actual fuel cell power (instantaneous fuel cell power) Pfc and target fuel cell power Pfctar attempted to be gradually decreased and the continuous and stable control of the fuel cell is not ensured near the transition time during a time period from the time t2 to a time t3.

It is desirable to provide a fuel cell system with a load driven by two power sources and a fuel cell automobile, which are capable of keeping the linearity of the variation in power of the fuel cell when a fuel-cell-side converter is moved from the step-up state to the direct connection state.

The present application describes a fuel cell system with a load driven by two power sources including a fuel cell that outputs fuel cell voltage; an electrical storage device that outputs electrical storage device voltage; the load; a fuel-cell-side converter that applies the fuel cell voltage to the load in a direct connection state or steps up the fuel cell voltage to apply the stepped-up fuel cell voltage to the load; an electrical-storage-device-side converter that steps up the electrical storage device voltage to apply the stepped-up electrical storage device voltage to the load; and a control unit that controls operations of the fuel-cell-side converter and the electrical-storage-device-side converter. The control unit controls duty of the electrical-storage-device-side converter so that the fuel cell voltage is subjected to smooth transition when a state in which the fuel cell voltage is controlled by the fuel-cell-side converter is switched to a state in which the fuel-cell-side converter is set to the direct connection state and the fuel cell voltage is controlled by the electrical-storage-device-side converter.

According to the present disclosure, in the fuel cell system with a load driven by two power sources in which the secondary side of the fuel-cell-side converter the primary side of which is connected to the fuel cell is connected to the secondary side of the electrical-storage-device-side converter the primary side of which is connected to the electrical storage device to drive the load, the driving duty of the electrical-storage-device-side converter is controlled so that the fuel cell voltage is subjected to the smooth transition in the transition time in which the fuel-cell-side converter controlling the fuel cell voltage in the step-up state is switched to the direct connection state and the fuel cell voltage is to be controlled with the load end voltage, which is the secondary voltage of electrical-storage-device-side converter. This allows the linearity of the variation in the fuel cell power to be kept when the fuel-cell-side converter is switched from the step-up state to the direct connection state. As a result, it is possible to ensure the continuous and stable control of the fuel cell near the transition time from the step-up state to the direct connection state of the fuel-cell-side converter.

In the fuel cell system with the load driven by the two power sources, the duty of the electrical-storage-device-side converter in the transition is preferably controlled in prospect of a voltage drop of the fuel-cell-side converter when the fuel-cell-side converter is in the direct connection state.

Since the duty of the electrical-storage-device-side converter has been set so that the output voltage from the electrical-storage-device-side converter is made smooth in the related art, the voltage (power) difference corresponding to the voltage drop caused by a resistance component of the fuel-cell-side converter and fuel cell current has occurred. However, controlling the duty of the electrical-storage-device-side converter in prospect of the voltage drop (the amount of change in voltage) allows the linearity of the variation in the fuel cell power in the transition time from the step-up state to the direct connection state of the fuel-cell-side converter to be kept.

The voltage drop of the fuel-cell-side converter is preferably stored in a storage device in advance as a characteristic of a function value using fuel cell current as a variable. In this case, it is possible for the fuel cell power to be subjected to more reliable and smooth transition in the transition time from the step-up state to the direct connection state of the fuel-cell-side converter. Multiple characteristics of the function value using the fuel cell current as the variable are preferably stored in the storage device with the temperature of the fuel-cell-side converter used as a parameter.

An amount corresponding to the voltage drop is preferably set as an initial value of an integral term when the electrical-storage-device-side converter is driven via a feedback portion that performs PID processing at least including a proportional term and the integral term to a deviation between target load end voltage and load end voltage. In this case, it is possible to reliably achieve the smooth transition of the fuel cell power with the simple configuration in the transition time from the step-up state to the direct connection state of the fuel-cell-side converter.

As described above, the voltage drop corresponds to multiplication (product) of the resistance component of the fuel-cell-side converter and the fuel cell current. The resistance component is composed of elements (parts) including a semiconductor element, such as a switching element, lines, and a reactor composing the fuel-cell-side converter. The resistance component of these elements is increased with the increasing temperature. The variation, for example, the increase in the resistance component varies the voltage drop despite the fact that the fuel cell current is constant. Accordingly, the temperature characteristics of the resistance component of the fuel-cell-side converter are acquired in advance and the initial value of the integral term is varied with the element temperature, that is, the variation in temperature of the fuel-cell-side converter in the transition time from the direct connection state to the step-up state of the fuel-cell-side converter. This allows the fuel cell power to be smoothly varied reliably with the simple configuration in the transition time from the step-up state to the direct connection state even if the element temperature (the temperature of the fuel-cell-side converter) is varied with the variation in the load.

The fuel cell system with the load driven by the two power sources is preferably applied to a fuel cell automobile including a drive motor, which is a drive source of the vehicle, in the load.

As a result, it is possible to ensure the continuous and stable control of the fuel cell near the transition time from the step-up state to the direct connection state of the fuel-cell-side converter.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell system comprising:
   a fuel cell to output fuel cell voltage;
   an electrical storage device to output electrical storage device voltage;
   a fuel-cell-side converter configured to apply the fuel cell voltage to a load in a direct connection state and configured to apply a stepped-up fuel cell voltage to the load;
   an electrical-storage-device-side converter configured to apply a stepped-up electrical storage device voltage to the load; and
   a controller configured to control duty of the electrical-storage-device-side converter so that the fuel cell voltage output by the fuel cell changes when a state in which the fuel cell voltage is controlled by the fuel-cell-side converter is switched to a state in which the fuel-cell-side converter is set to the direct connection state and the fuel cell voltage is controlled by the electrical-storage-device-side converter, wherein the duty of the electrical-storage-device-side converter in a transition where the state in which the fuel cell voltage is controlled by the fuel-cell-side converter is switched to the state in which the fuel-cell-side converter is set to the direct connection state and the fuel cell voltage is controlled by the electrical-storage-device-side converter is controlled in prospect of a voltage drop of the fuel-cell-side converter generated when the fuel-cell-side converter is in the direct connection state.

2. The fuel cell system according to claim 1,
wherein the voltage drop of the fuel-cell-side converter is stored in a storage device in advance as a characteristic of a function value using fuel cell current as a variable.

3. The fuel cell system according to claim 2,
wherein a plurality of characteristics of the function value using the fuel cell current as the variable are stored in the storage device with a temperature of the fuel-cell-side converter used as a parameter.

4. The fuel cell system according to claim 1,
wherein an amount corresponding to the voltage drop is set as an initial value of an integral term when the electrical-storage-device-side converter is driven via a feedback portion that performs PID processing including at least a proportional term and the integral term using a deviation between target load end voltage and load end voltage.

5. The fuel cell system according to claim 1, further comprising the load.

6. The fuel cell system according to claim 1,
wherein the voltage drop of the fuel-cell-side converter is caused by resistance component of the fuel-cell-side converter and fuel cell current generated by the fuel cell.

7. The fuel cell system according to claim 1,
wherein the controller is configured to initiate an adjustment of the duty of the electrical-storage-device-side converter in response to the transition to the state in which the fuel-cell-side converter is set to the direct connection state.

8. The fuel cell system according to claim 1,
wherein the controller is configured to control an amount of an adjustment of the duty of the electrical-storage-device-side converter based on a temperature of the fuel-cell-side converter.

9. A fuel cell automobile comprising:
the fuel cell system according to claim 5,
wherein the load includes a drive motor.

10. A fuel cell system with a load driven by two power sources, the fuel cell system comprising:
a fuel cell that outputs fuel cell voltage;
an electrical storage device that outputs electrical storage device voltage;
the load;
a fuel-cell-side converter that applies the fuel cell voltage to the load in a direct connection state and steps up the fuel cell voltage to apply the stepped-up fuel cell voltage to the load;
an electrical-storage-device-side converter that steps up the electrical storage device voltage to apply the stepped-up electrical storage device voltage to the load; and
a controller that controls operations of the fuel-cell-side converter and the electrical-storage-device-side converter, wherein the controller controls duty of the electrical-storage-device-side converter so that the fuel cell voltage output by the fuel cell changes when a state in which the fuel cell voltage is controlled by the fuel-cell-side converter is switched to a state in which the fuel-cell-side converter is set to the direct connection state and the fuel cell voltage is controlled by the electrical-storage-device-side converter, and wherein the duty of the electrical-storage-device-side converter in a transition where the state in which the fuel cell voltage is controlled by the fuel-cell-side converter is switched to the state in which the fuel-cell-side converter is set to the direct connection state and the fuel cell voltage is controlled by the electrical-storage-device-side converter is controlled in prospect of a voltage drop of the fuel-cell-side converter generated when the fuel-cell-side converter is in the direct connection state.

11. The fuel cell system according to claim 10,
wherein the voltage drop of the fuel-cell-side converter is stored in a storage device in advance as a characteristic of a function value using fuel cell current as a variable.

12. The fuel cell system according to claim 11,
wherein a plurality of characteristics of the function value using the fuel cell current as the variable are stored in the storage device with a temperature of the fuel-cell-side converter used as a parameter.

13. The fuel cell system according to claim 10,
wherein an amount corresponding to the voltage drop is set as an initial value of an integral term when the electrical-storage-device-side converter is driven via a feedback portion that performs PID processing at least including a proportional term and the integral term to a deviation between target load end voltage and load end voltage.

14. The fuel cell system according to claim 10,
wherein the load includes a drive motor of a vehicle.

15. The fuel cell system according to claim 10,
wherein the controller initiates an adjustment of the duty of the electrical-storage-device-side converter in response to the transition to the state in which the fuel-cell-side converter is set to the direct connection state.

16. The fuel cell system according to claim 10,
wherein the controller controls an amount of an adjustment of the duty of the electrical-storage-device-side converter based on a temperature of the fuel-cell-side converter.

17. A fuel cell system comprising:
a fuel cell to output fuel cell voltage;
an electrical storage device to output electrical storage device voltage;
a fuel-cell-side converter configured to apply the fuel cell voltage to a load in a direct connection state and configured to apply a stepped-up fuel cell voltage to the load;
an electrical-storage-device-side converter configured to apply a stepped-up electrical storage device voltage to the load; and
a controller configured to control duty of the electrical-storage-device-side converter so that the fuel cell voltage output by the fuel cell changes when a state in which the fuel cell voltage is controlled by the fuel-cell-side converter is switched to a state in which the fuel-cell-side converter is set to the direct connection state and the fuel cell voltage is controlled by the electrical-storage-device-side converter, wherein the controller controls the duty of the electrical-storage-device-side converter so that the fuel cell voltage increases linearly when the state in which the fuel cell voltage is controlled by the fuel-cell-side converter is switched to the state in which the fuel-cell-side converter is set to the direct connection state and the fuel cell voltage is controlled by the electrical-storage-device-side converter.

18. The fuel cell system according to claim 17,
wherein the controller is configured to initiate an adjustment of the duty of the electrical-storage-device-side converter in response to a transition to the state in which the fuel-cell-side converter is set to the direct connection state.

19. The fuel cell system according to claim 17,
wherein the controller is configured to control an amount of an adjustment of the duty of the electrical-storage-device-side converter based on a temperature of the fuel-cell-side converter.

* * * * *